US007289405B2

(12) United States Patent  (10) Patent No.: US 7,289,405 B2
Kim et al.  (45) Date of Patent: Oct. 30, 2007

(54) APPARATUS AND METHOD FOR DETECTING OPTICAL DISC TYPE AND/OR ADJUSTING TRACK BALANCE

(75) Inventors: Je-koonk Kim, Yongin (KR); Young-wook Jang, Yongin (KR); Suk-jung Lee, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 615 days.

(21) Appl. No.: 10/706,819

(22) Filed: Nov. 12, 2003

(65) Prior Publication Data

US 2005/0068872 A1  Mar. 31, 2005

(30) Foreign Application Priority Data

Nov. 12, 2002 (KR) ............... 10-2002-0069996
Nov. 14, 2002 (KR) ............... 10-2002-0070865

(51) Int. Cl.
  *G11B 7/0005* (2006.01)
(52) U.S. Cl. .............. 369/53.23; 369/44.25; 369/44.32; 369/44.35; 369/30.13; 369/30.14
(58) Field of Classification Search ............ 369/53.23, 369/44.25, 44.32, 44.35, 112.23, 30.14, 30.13
  See application file for complete search history.

(56) References Cited

U.S. PATENT DOCUMENTS

| 5,003,521 A | * | 3/1991 | Yoshida et al. | 369/44.25 |
| 5,748,597 A | * | 5/1998 | Kim | 369/94 |
| 6,058,082 A | * | 5/2000 | Hwang | 369/44.27 |
| 6,243,341 B1 | * | 6/2001 | Hasimoto | 369/53.22 |
| 6,882,603 B2 | * | 4/2005 | Kadlec | 369/44.32 |

FOREIGN PATENT DOCUMENTS

| CN | 1224216 A | 7/1999 |
| KR | 1998-0086187 | 12/1998 |

* cited by examiner

*Primary Examiner*—Wayne Young
*Assistant Examiner*—Thomas Alunkal
(74) *Attorney, Agent, or Firm*—F. Chau & Associates, LLC

(57) ABSTRACT

Provided are an apparatus and method for detecting a type of an optical disc inserted into an optical disc system and/or adjusting a track balance in the optical disc system by detecting voltages of a focus error signal and a tracking error signal. For detecting a type of an optical disc inserted into an optical disc system, the apparatus comprising: an analog-to-digital converter that converts a focus error signal into n-bit voltage data; and a duty measurer that compares the n-bit voltage data with a positive noise voltage level and a negative noise voltage level, upcounts by a predetermined value if the n-bit voltage data is higher than the positive noise voltage level or lower than the negative voltage level, and outputs the upcounted result as a duty of the focus error signal.

27 Claims, 9 Drawing Sheets

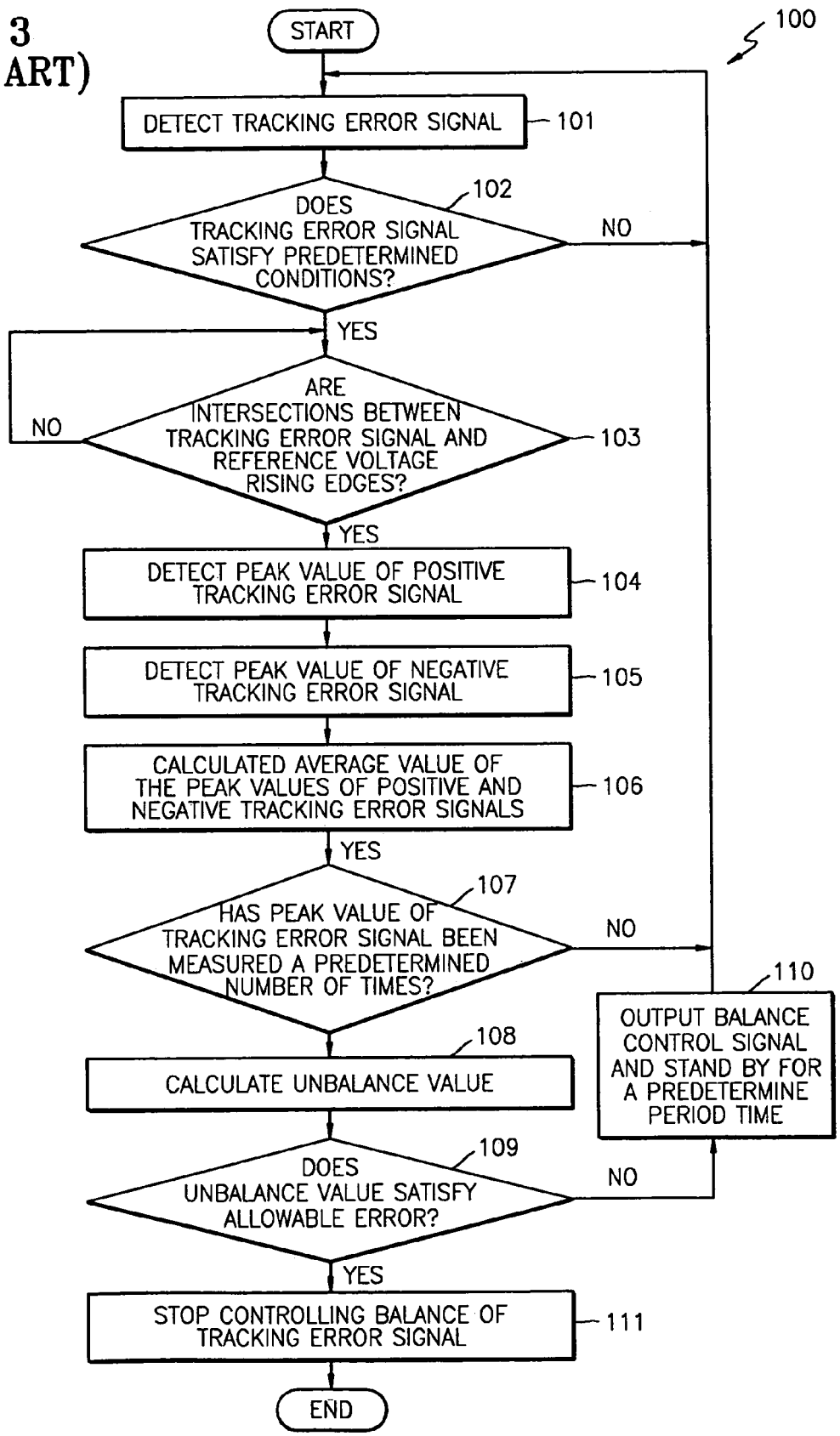

APPARATUS AND METHOD FOR DETECTING OPTICAL DISC TYPE AND/OR ADJUSTING TRACK BALANCE

BACKGROUND OF THE INVENTION

1. Technical Field

The present invention relates to an optical disc system used to record data on and/or read data from an optical disc, and more particularly, to an apparatus and method for detecting a type of an optical disc inserted into an optical disc system and/or adjusting track balance.

2. Description of the Related Art

It is known that an optical disc system reads data from an optical disc such as a compact disc (CD) or a digital video disc (DVD), or record data on a CD-rewritable (CD-RW). The optical disc system uses a laser beam to radiate onto the optical disc and an optical pickup to detect variations in the strength of the laser beam reflected from the optical disc. The varied strengths detected are converted to digital data read from the optical disc. The optical disc system adjusts the track balance before reading data from the optical disc inserted into the optical disc system. The optical disc system calculates a track unbalance value from a tracking error signal to adjust the track balance.

FIG. 1 shows a circuit diagram of a conventional tracking error signal generator used in a general optical disc system. Referring to FIG. 1, a tracking error signal generator 20 includes photodiodes 21 and 22, current-to-voltage (I/V) converters 23 and 24, a differential amplifier 25, and resistors Rf and Rv.

The photodiodes 21 and 22 generate currents $I_F$ and $I_E$, respectively, in response to F and E beams, which are reflected light detected by an optical pickup.

The I/V converters 23 and 24 convert the currents $I_F$ and $I_E$ into voltages $V_F$ and $V_E$, respectively. The I/V converters 23 and 24 may be amplifiers having gains which are respectively adjusted by the values of the resistors Rf and Rv.

The differential amplifier 25 amplifies a difference between the voltages $V_F$ and $V_E$ to output the difference as a tracking error signal TE.

The F and E beams are sub beams which are arranged before and after a moving direction of a main (M) beam used for reproduction of a data signal to detect the tracking error signal TE. The M beam moves along a pit row.

FIGS. 2A and 2B show waveforms of the tracking error signal TE generated by the tracking error signal generator 20. The tracking error signal TE is divided into a positive tracking error signal and a negative tracking error signal based on a reference voltage VREF. It is preferable that a peak voltage $+VTE_{PK}$ of the positive tracking error signal and a peak voltage $-VTE_{PK}$ of the negative tracking error signal are symmetrical with respect to the reference voltage VREF, as shown in FIG. 2A. If the peak voltage $+VTE_{PK}$ of the positive tracking error signal and the peak voltage $-VTE_{PK}$ of the negative tracking error signal are asymmetrical with respect to the reference voltage VREF, a margin of one of the positive and negative tracking error signals of the tracking error signal TE is reduced. In FIG. 2B, a margin of the negative tracking error signal is narrower than a margin of the positive tracking error signal.

When a margin of the tracking error signal TE is reduced, a range of controlling tracks is reduced and tracks beyond the range cannot be controlled.

As shown in FIG. 2B, a central voltage VTEC of the tracking error signal TE is offset with respect to the reference voltage VREF due to a difference between amounts of the F and E beams and a difference between gains obtained by the I/V converters 23 and 24.

Accordingly, to make the tracking error signal TE symmetrical with respect to the reference voltage VREF, a track balance adjustment is needed to allow the central voltage VTEC of the tracking error signal TE to coincide with the reference voltage VREF.

FIG. 3 shows a flowchart 100 of a conventional method of adjusting a track balance in an optical disc system. FIG. 4 shows a waveform of a tracking error signal produced by the method of FIG. 3.

Referring to FIGS. 3 and 4, in step 101, an optical disc system detects a tracking error signal TE. In step 102, a determination is made as to whether the tracking error signal TE satisfies predetermined conditions. When the tracking error signal TE does not satisfy the predetermined conditions of a predetermined frequency range and a predetermined amplitude range $T_{Length}$, the tracking error signal TE is filtered in step 103.

In step 103, a determination is made as to whether intersections between the tracking error signal TE and the reference voltage VREF are rising edges of the tracking error signal TE indicated by A, B, C, and D shown in FIG. 4.

If the determination is made that the intersections between the tracking error signal TE and the reference voltage VREF are the rising edges, in step 104, a peak value $+VTE_{PK}$ of a positive tracking error signal is detected. A greater value obtained from a comparison between a previously received tracking error signal TE and a subsequently received tracking error signal TE is updated as the peak value $+VTE_{PK}$. Successively received tracking error signals TE are continuously compared to detect a maximum value as the peak value $+VTE_{PK}$.

In step 105, a peak value $-VTE_{PK}$ of a negative tracking error signal is detected. The peak value $-VTE_{PK}$ can also be updated by continuously comparing successively received tracking error signals TE.

In step 106, an average value of the peak values $+VTE_{PK}$ and $-VTE_{PK}$ is calculated using Equation of AVTE1=(+$VTE_{PK}$ and $-VTE_{PK}$)/2.

In step 107, a determination is made as to whether a peak value of the tracking error signal TE is measured a predetermined number of times (N), where N is a natural number. If in step 107, the determination is made that the peak value of the tracking error signal TE is not measured N times, the optical disc system returns to step 101 to repeat steps 101 through 107.

If in step 107, the determination is made that the peak value of the tracking error signal TE reaches N times, in step 108, an average value of average values AVTE1 through AVTEN calculated during the N-time measurements is determined as an unbalance value UBAL.

In step 109, a determination is made as to whether the unbalance value UBAL satisfies an allowable error. If in step 109, the determination is made that the unbalance value UBAL does not satisfy the allowable error, in step 110, the optical disc system outputs a balance control signal BAL_CTL. The balance control signal BAL_CTL is used to adjust a gain of the tracking error signal generator 20 shown in FIG. 1, after a predetermined period of time TBwt, and returns to step 101. As shown in FIG. 4, the predetermined period of time TBwt refers to a time for which the tracking error signal TE is stabilized after the gain of the tracking error signal generator 20 is adjusted.

If in step 109, the determination is made that the unbalance value UBAL satisfies the allowable error, in step 111, the optical disc system stops controlling the balance of the tracking error signal TE.

In the above-described track balance adjusting method, the unbalance value UBAL is detected using only the peak values $+\text{VTE}_{PK}$ and $-\text{VTE}_{PK}$ of the tracking error signal TE. Errors may occur in the peak values $+\text{VTE}_{PK}$ and $-\text{VTE}_{PK}$ due to noise. Also, the frequency range, the amplitude range $T_{Length}$, and the predetermined number, N, peak values $+\text{VTE}_{PK}$ and $-\text{VTE}_{PK}$ must be properly set.

The optical disc system also performs a focus search to discern between a CD and a CD-RW. A focus error signal appears in an S-Curve form. A greater absolute value may be obtained from a comparison between absolute values of positive and negative peaks of S-Curves and then compared with a detecting level of the CD-RW to detect the type of an optical disc inserted into the optical disc system.

FIGS. 5A and 5B show graphs used for detecting a disc type according to the conventional art. FIG. 5A shows an output signal FOD output of a focus servo to move a lens. FIG. 5B shows a focus error (FE) signal indicating an amount of light reflected from an optical disc, where the FE signal is also called S-Curves. A peak value of a FE signal detected from a CD is different from a peak value of a FE signal detected from a CD-RW. Accordingly, for detection of a disc type, a positive peak value of the FE signal is compared with a negative peak value of the FE signal to select the greater absolute value, and then the greater absolute value is compared with a predetermined disc detection level DDT_J. When the selected absolute value is less than the disc detection level DDT_J, the disc type is determined as the CD-RW. When the selected absolute value is greater than the disc detection level DDT_J, the disc type is determined as the CD.

The FE signal may be offset when the disc type is detected using the peak values of the FE signal, which affects the detection of the disc type. For example, in a case where the FE signal detected from the CD-RW is offset, and thus a positive peak value of the FE signal is greater than the disc detection level DDT_J, the CD-RW is mistakenly detected as the CD. In addition, a glitch may occur in the FE signal due to noise and thus be misinterpreted as a peak value, which results in the erroneous detection of the disc type.

In addition, for the accurate detection of the disc type, the peak value of the FE signal may be measured several times. In this case, an average value of the peak values may be calculated to detect the disc type using the average value to accurately detect the disc type. However, this process increases read-in time.

Accordingly, when a peak value of a tracking error signal or a focus error signal is detected to adjust a track balance in an optical disc system or detect a type of an optical disc inserted into the optical disc system, the track balance may be wrongly adjusted or the type of the optical disc may be mistakenly detected due to offset or noise components of the track error signal or the focus error signal.

Therefore, a need exists for a system and method for stably adjusting the track balance and accurately detecting the type of the optical disc with reduced read-in time.

SUMMARY OF THE INVENTION

According to an aspect of the present invention, there is provided an apparatus for detecting a type of an optical disc inserted into an optical disc system. The apparatus includes an analog-to-digital converter that converts the focus error signal into an n-bit voltage data and a duty measurer that compares the n-bit voltage data with a positive noise voltage level and a negative noise voltage level, upcounts by a predetermined value if the n-bit voltage data is higher than the positive noise voltage level or lower than the negative voltage level, and outputs the upcounted result as a duty of the focus error signal.

According to another aspect of the present invention, there is provided an apparatus for detecting a type of an optical disc inserted into an optical disc system. The apparatus includes an analog-to-digital converter that converts the focus error signal into an n-bit voltage data and a reflected light amount measurer that compares current voltage data of the n-bit voltage data with previous voltage data of the n-bit voltage data, upcounts by a predetermined value if the current voltage data is more than a predetermined value different from the previous voltage data, and outputs the upcounted result as an amount of reflected light.

According to still another aspect of the present invention, there is provided a method of detecting a type of an optical disc inserted into an optical disc system. The focus error signal is detected from the optical disc. A duty of the focus error signal is measured by detecting a voltage of the focus error signal and the type of the optical disc is detected depending on the measured duty.

According to yet another aspect of the present invention, there is provided a method of detecting a type of an optical disc inserted into an optical disc system. The focus error signal is detected from the optical disc. An amount of reflected light of the focus error signal is measured by detecting a voltage of the focus error signal and the type of the optical disc is detected depending on the measured amount of reflected light.

According to yet another aspect of the present invention, there is provided an apparatus for adjusting a track balance in an optical disc system. The apparatus includes an analog-to-digital converter that converts the tracking error signal into n-bit voltage data, a duty measurer that compares the n-bit voltage data with a predetermined reference voltage, upcounts or downcounts by a predetermined value based on the comparison result, and outputs the counted result accumulated for a predetermined balance adjustment time as an unbalance value of the tracking error signal, and a controller that compares the unbalance value with a predetermined allowable error and outputs a balance control signal to adjust a balance of the tracking error signal if the unbalance value exceeds the predetermined allowable error.

According to yet another aspect of the present invention, there is provided an apparatus for adjusting a track balance in an optical disc system. The apparatus includes an analog-to-digital converter that converts the tracking error signal into n-bit voltage data, a reflected light amount measurer that compares current voltage data of the n-bit voltage data and previous voltage data of the n-bit voltage data with a reference voltage, upcounts or downcounts by a predetermined value based on the comparison result, and outputs the counted result accumulated for a predetermined balance adjustment time as an unbalance value of the tracking error signal, and a controller that compares the unbalance value with a predetermined allowable error and outputs a balance control signal to adjust a balance of the tracking error signal if the unbalance value exceeds the predetermined allowable error.

According to yet another aspect of the present invention, there is provided a method of adjusting a track balance in an optical disc system. The tracking error signal is detected from an optical disc inserted into the optical disc system. A voltage of the tracking error signal is detected and a duty of the tracking error signal with respect to a predetermined reference voltage is measured as an unbalance value for a predetermined balance adjustment time. The unbalance value is compared with a predetermined allowable error and a balance control signal is generated to adjust a balance of the tracking error signal if the unbalance value exceeds the predetermined allowable error.

According to yet another aspect of the present invention, there is provided a method of adjusting a track balance in an optical disc system. The tracking error signal is detected from an optical disc inserted into the optical disc system. A voltage of the tracking error signal is detected and an amount of reflected light of the tracking error signal with respect to a predetermined reference voltage is measured as an unbalance value of the tracking error signal for a predetermined balance adjustment time. The unbalance value is compared with a predetermined allowable error and a balance control signal is generated to adjust a balance of the tracking error signal if the unbalance value exceeds the predetermined allowable error.

BRIEF DESCRIPTION OF THE DRAWINGS

The present invention will become more apparent by describing in detail exemplary embodiments thereof with reference to the attached drawings in which:

FIG. 3 shows a flowchart 100 of a conventional method of adjusting a track balance in an optical disc system;

DETAILED DESCRIPTION OF PREFERRED EMBODIMENTS

Figure 6:
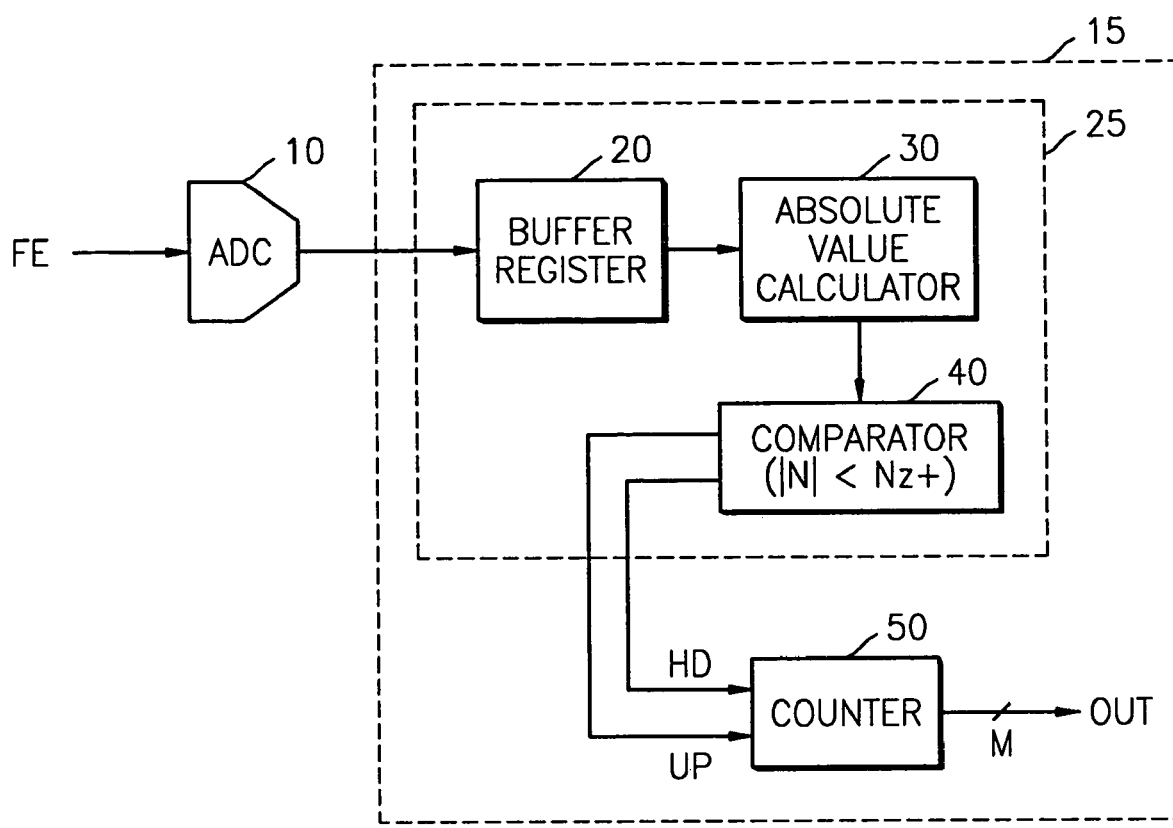
FIG. 6 shows a block diagram of an apparatus for detecting a disc type according to an embodiment of the present invention.

FIG. 6 shows a block diagram of an apparatus for detecting a disc type by detecting a voltage of a focus error signal, according to an embodiment of the present invention. Referring to FIG. 6, the apparatus includes an analog-to-digital converter (ADC) 10 and a duty measurer 15, to be further described below.

Figure 1:
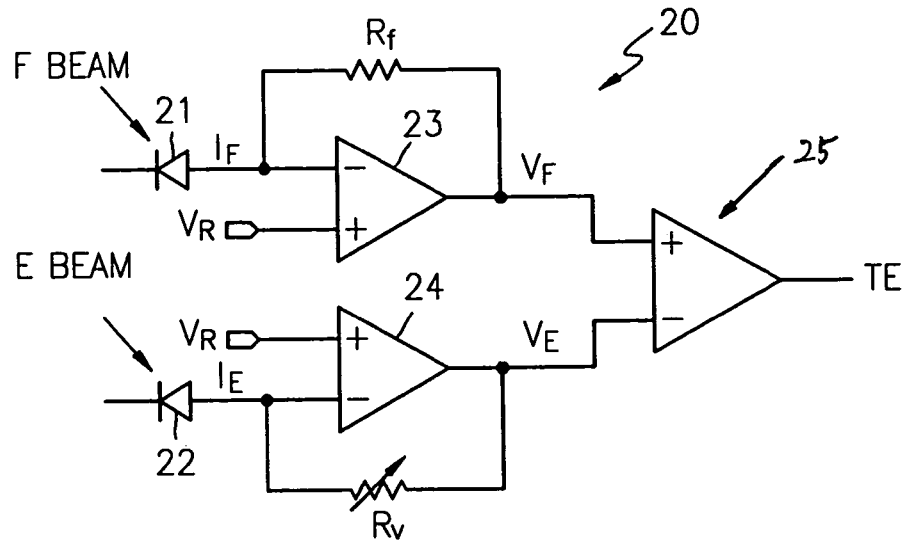
FIG. 1 shows a circuit diagram of a conventional tracking error signal generator used in a general optical disc system.
Figure 2A:
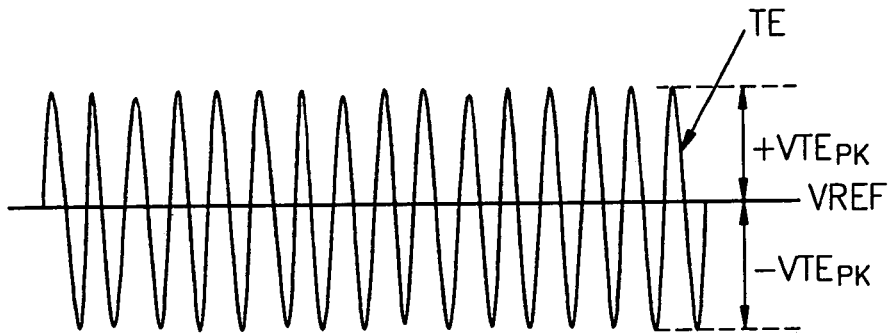
FIGS. 2A and 2B show a waveform of the tracking error signal TE generated by the tracking error signal generator 20.
Figure 2B:
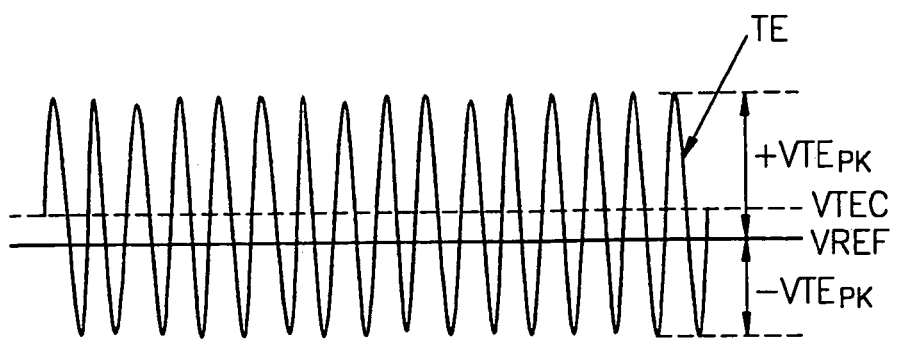
Figure 4:
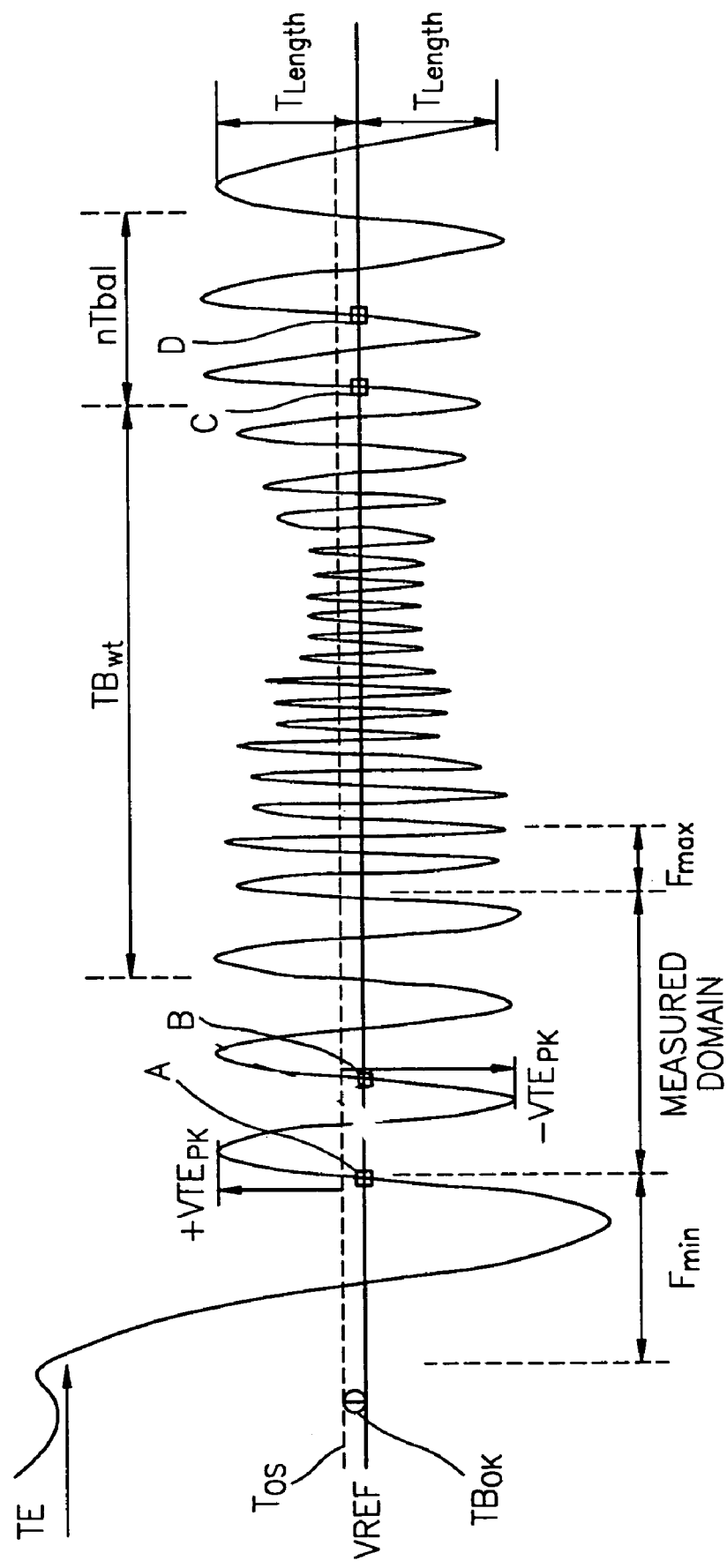
FIG. 4 shows a view showing a waveform of a tracking error signal produced by the method of FIG. 3.
Figure 5A:
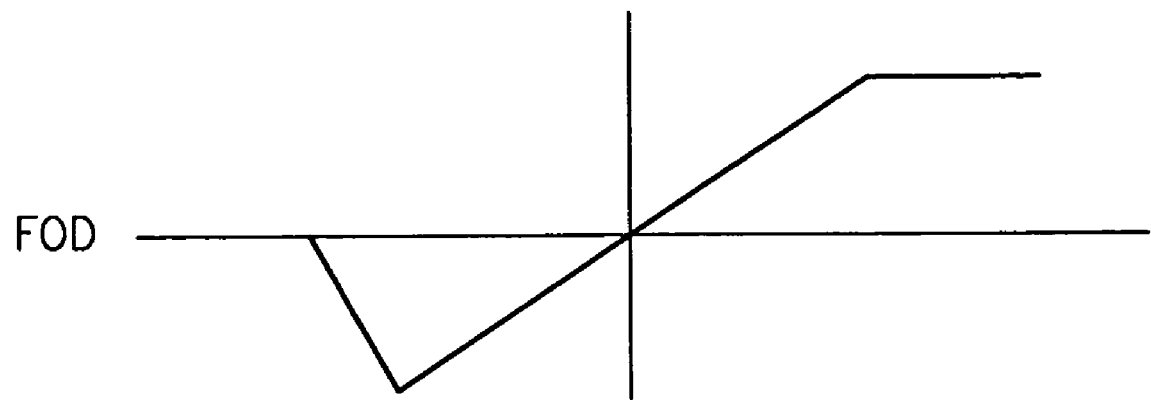
FIGS. 5A and 5B show graphs used for detecting a disc type, according to the prior art.

As previously seen in FIG. 5, a duty of S-Curves detected from a CD is different from a duty of S-Curves detected from a CD-RW due to a difference between amounts of light reflected from the CD and the CD-RW at the same search speed. Although glitches occur in the S-curves due to offset or noise components, the duty of the S-curves does not greatly vary. Thus, the disc type can be detected using the duty characteristics. In other words, S-curves are detected from an optical disc inserted into an optical disc system, and then a duty of the S-curve is measured to detect whether the optical disc is a CD or a CD-RW.

The ADC 10 converts a voltage level of an analog FE signal into digital data. The duty measurer 15 compares the digital data output from the ADC 10 with a positive noise voltage level NZ+ and a negative noise voltage level NZ−. If the digital data is higher than the positive noise voltage level NZ+ or lower than the negative noise voltage level NZ−, a predetermined value is upcounted and the upcounted value is output as a duty of S-Curves. The duty of the S-Curves greatly varies depending on the type of an inserted optical disc, as shown in FIG. 5. Since the duty of S-Curves detected from a CD-RW is shorter than the duty of S-Curves detected from a CD, whether the inserted optical disc is a CD-RW or a CD can be determined by using a duty value output from the duty measurer 15.

Referring again to FIG. 6, the duty measurer 15 includes a comparing unit 25 and a counter 25. The positive and negative noise voltage levels NZ+ and NZ− are used to determine whether an optical disc is inserted into the optical disc system. When a value output from the ADC 10 is lower than the positive noise voltage level NZ+ and higher than the negative noise voltage level NZ−, a determination is made that the optical disc is not inserted into the optical disc system.

The comparing unit 25 compares the digital data output from the ADC 10 with the positive and negative noise voltage levels NZ+ and NZ−, determines that the digital data appears in the S-curve form if the digital data is higher than the positive noise voltage level NZ+ or lower than the negative noise voltage level NZ−, and generates an upcount signal UP. When the digital data is lower than the positive noise voltage level NZ+ or higher than the negative noise voltage level NZ−, the comparing unit 25 determines that the digital data does not appear in the S-curve form and thus generates a hold signal HD. The comparing unit 25 includes a buffer register 20, an absolute value calculator 30, and a comparator 40.

The buffer register 20 buffers digital data N output from the ADC 10. The absolute value calculator 30 calculates an absolute value |N| of the digital data N buffered by the buffer register 20 and outputs the absolute value |N| to the comparator 40. The comparator 40 compares the absolute value |N| with the positive noise voltage level NZ+ and generates the upcount signal UP if the absolute value |N| is greater than the positive noise voltage level NZ+ or generates the hold signal HD if the absolute value |N| is less than the positive noise voltage level NZ+. The counter 50 upcounts by a predetermined value, for example, by 1, in response to the upcount signal UP and holds a current count value in response to the hold signal HD.

As described above, the duty of S-Curves does not greatly vary even though offset or glitches occur in the S-Curves due to noise components. Therefore, a type of an inserted optical disc can be further accurately detected by measuring the duty of S-Curves.

Figure 7:
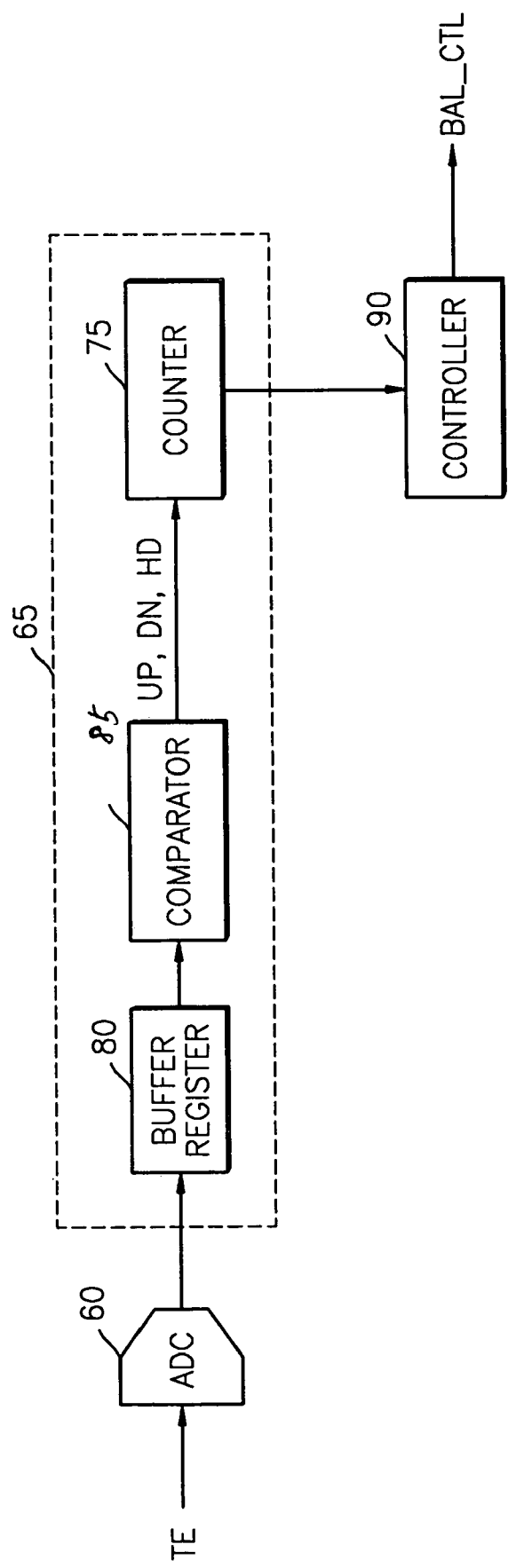
FIG. 7 shows a block diagram of an apparatus for adjusting a track balance in an, optical disc system according to another embodiment of the present invention.

FIG. 7 shows a block diagram of an apparatus for adjusting a track balance in an optical disc system by detecting a voltage of a tracking error signal, according to an embodiment of the present invention. Referring to FIG. 7, the apparatus includes an ADC 60, a duty measurer 65, and a controller 90.

Figure 8A:
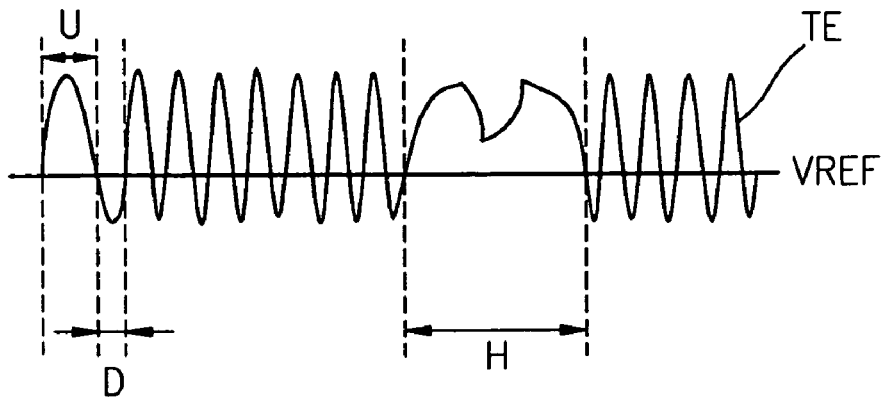
FIGS. 8A, 8B, and 8C show waveforms of a tracking error signal to explain the operation of the apparatus shown in FIG. 7.
Figure 8B:
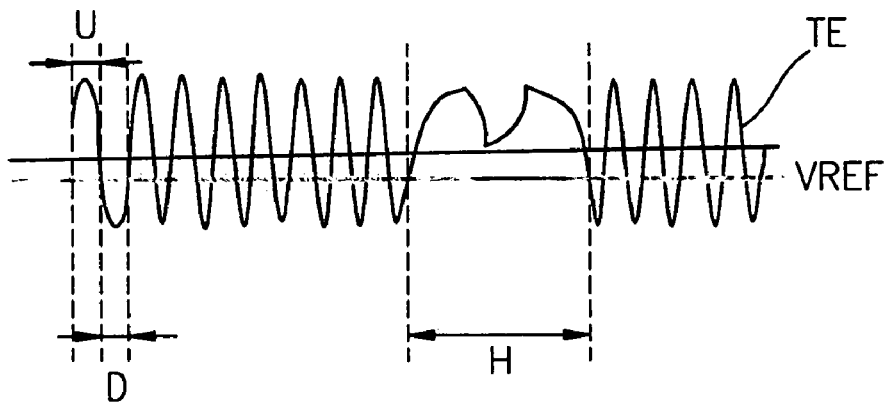
Figure 8C:
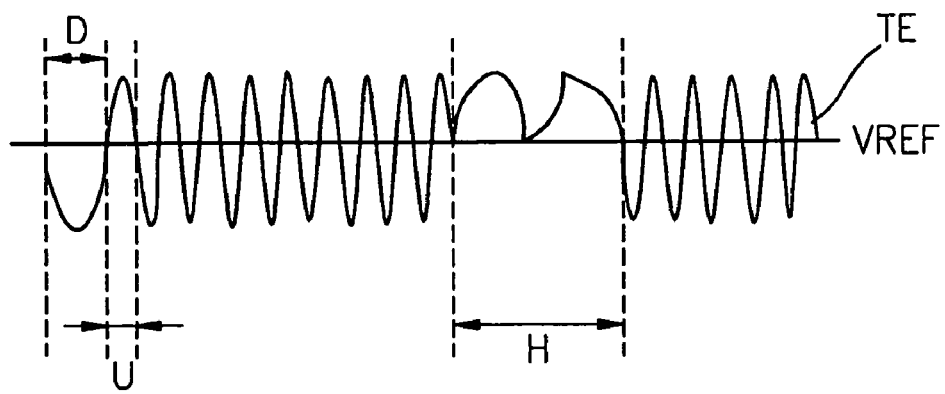

FIGS. 8A, 8B, and 8C show waveforms of a tracking error signal to illustrate the operations of the apparatus of FIG. 7. FIG. 8A shows a case where a duty of a positive tracking error signal +TE is longer than a duty of a negative tracking error signal –TE. FIG. 8B shows a case where the duty of the positive tracking error signal +TE is equal to the duty of the negative tracking error signal –TE, i.e., a case where a balance is achieved. FIG. 8C shows a case where the duty of the positive tracking error signal +TE is shorter than the duty of the negative tracking error signal –TE.

Referring to FIGS. 8A, 8B, and 8C, whether a track balance is achieved can be detected by comparing the duty of the positive tracking error signal +TE and the duty of the negative tracking error signal –TE. Although the tracking error signal TE is offset or has glitches due to noise components, the duties of the positive and negative tracking error signals +TE and –TE do not greatly vary. Thus, the track balance can be adjusted using the characteristics of the duty of the tracking error signal TE.

To be more specific, referring to FIGS. 7 and 8, the ADC 60 converts a voltage level of an analog tracking error signal TE into digital data. The duty measurer 65 compares the digital data output from the ADC 60 with a reference voltage VREF, upcounts by a predetermined value if the digital data is higher than the reference voltage VREF as in section "U" of FIGS. 8A, 8B, and 8C, and downcounts by a predetermined value if the digital data is lower than the reference voltage VREF as in section "D" of FIGS. 8A, 8B, and 8C. The duty measurer 65 holds a current count value without measuring the duty of the tracking error signal TE in a low frequency domain such as section "H" of FIGS. 8A, 8B, and 8C and outputs the current count value as an unbalance value of the tracking error signal TE. The difference of the positive tracking error signal +TE and the negative tracking error signal –TE depends on an unbalance degree of the tracking error signal TE.

The duty measurer 65 includes a buffer register 80, a comparator 85, and a counter 75. The buffer register 80 buffers digital data N output from the ADC 10.

The comparator 85 compares the digital data N buffered by the buffer register 80 with the reference voltage VREF, generates an upcount signal UP if the digital data N is greater than the reference voltage VREF, and generates a downcount signal DN if the digital data N is less than the reference voltage VREF. The comparator 85 also generates a hold signal HD in the low frequency domain such as section "H" of FIGS. 8A, 8B, and 8C.

The counter 75 upcounts by a predetermined value, for example, by 1, in response to the upcount signal UP output from the comparator 85, downcounts by a predetermined value, for example, by 1, in response to the downcount signal DN, and holds the current count value in response to the hold signal HD. The counter 75 performs an upcount and/or downcount operation for a predetermined balance adjustment time based on the comparison result of the comparator 85 and outputs a count value accumulated for the predetermined balance adjustment time as an unbalance value.

The controller 90 compares the unbalance value output from the duty measurer 65 with a predetermined allowable error and outputs a balance control signal BAL_CTL to adjust a balance of the tracking error signal TE if the unbalance value exceeds the predetermined allowable error.

Figure 9:
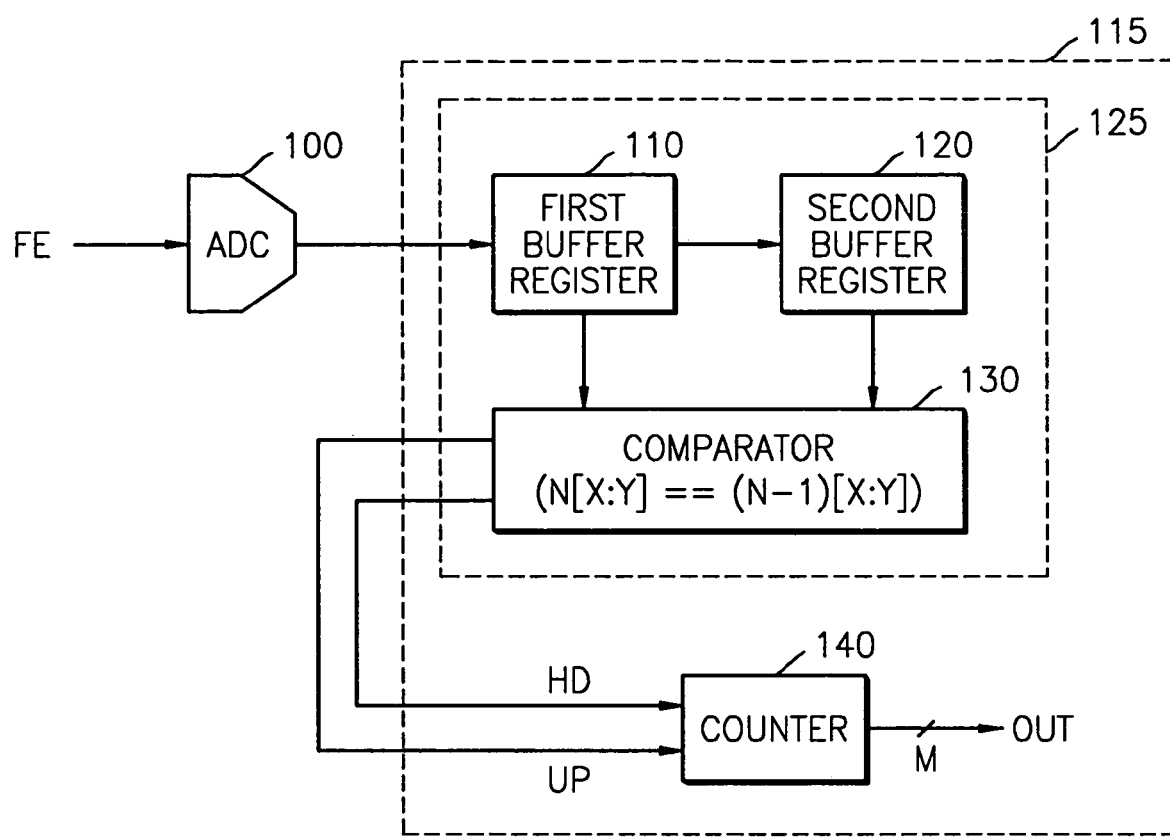
FIG. 9 is a block diagram of an apparatus for detecting a disc type by detecting a voltage of a focus error signal, according to another embodiment of the present invention.

FIG. 9 shows a block diagram of an apparatus for detecting an optical disc type by detecting a voltage of a focus error signal, according to another embodiment of the present invention. Referring to FIG. 9, the apparatus includes an ADC 100 and a reflected light amount measurer 115.

Figure 5B:
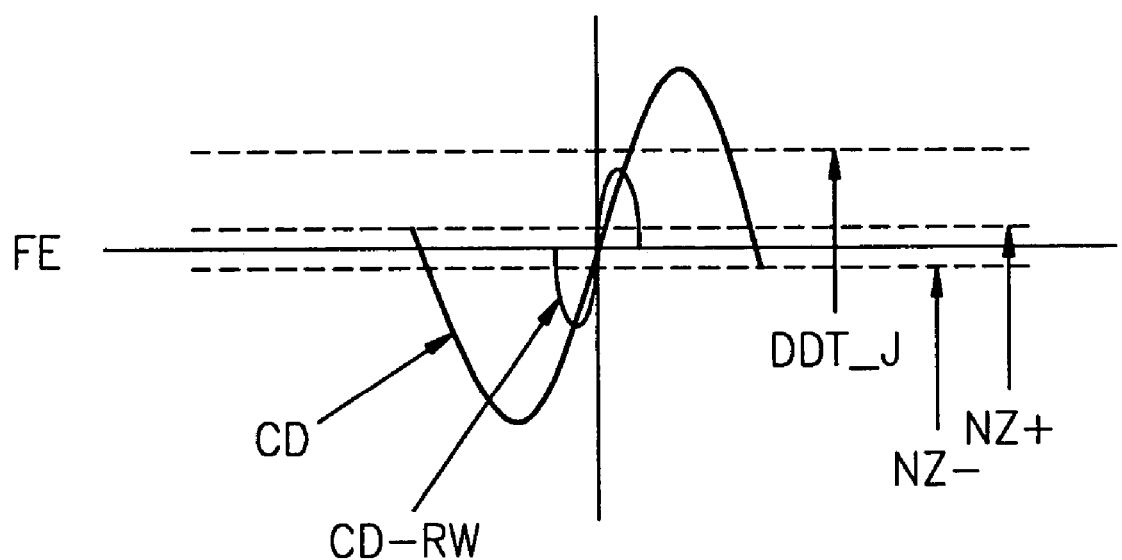

As previously described with reference to FIG. 5B, S-Curves of different shapes are generated on a CD and a CD-RW due to a difference between amounts of light reflected from the CD and the CD-RW at the same search speed. If an instant voltage difference is more than a predetermined value, the instant voltage difference may be regarded as resulting from the S-Curves. Thus, the apparatus upcounts by a predetermined value, and obtains the upcounted result as an amount of reflected light with respect to S-curves. As shown in FIG. 5B, the S-Curves are generated due to a difference between amounts of reflected light. Thus, the type of an inserted optical disc can be detected using the S-Curves. Like the duty of the S-Curves, the amounts of reflected light do not greatly vary although the S-Curves are offset or the S-Curves have glitches due to noise components. Therefore, the type of the inserted optical disc can be further stably detected.

Referring to FIG. 9, the ADC 100 converts a voltage level of an analog FE signal into n-bit digital voltage data. The reflected light amount measurer 115 compares current voltage data N output from the ADC 100 with previous voltage data N-1, upcounts by a predetermined value if the current voltage data N is more than a predetermined value different from the previous voltage data N-1, and outputs the upcounted result as an amount of reflected light with respect to the S-Curves. As shown in FIG. 5B, S-Curves indicating the amounts of reflected light vary depending on whether the inserted optical disc is a CD or a CD-RW. In other words, compared to the CD, a relatively small amount of light is reflected from the CD-RW. Thus, whether the inserted optical disc is the CD or the CD-RW can be detected from the amount of reflected light output from the reflected light amount measurer 115.

The reflected light amount measurer 115 includes a comparing unit 125 and a counter 140. The comparing unit 125 compares the current voltage data N output from the ADC 100 with the previous voltage data N-1, generates an upcount signal UP if the current voltage data N is more than a predetermined value different from the previous voltage data N-1, and generates a hold signal HD if the current voltage data N is not different from the previous voltage data N-1. The comparing unit 125 includes first and second buffer registers 110 and 120 and a comparator 130.

The first buffer register 110 buffers n-bit voltage data output from the ADC 100 as the current voltage data N. The second buffer register 120 buffers the n-bit voltage data output from the ADC 100 as the previous voltage data N-1. The comparator 130 compares upper m (where m<n) bits of the n-bit voltage data buffered by the first buffer register 110 with upper m bits of the n-bit voltage data buffered by the second buffer register 120, generates the hold signal HD if the upper m bits are equal, and generates the upcount signal UP if the upper m bits are different. For example, when the ADC 100 outputs 8-bit data and a voltage of 2.56V is input to the ADC 100, the ADC 100 has a resolution of 10 mV (=2.56V/256). When the comparator 130 compares upper 7 bits of the current voltage data N with upper 7 bits of the previous voltage data N-1, the comparator 130 generates the hold signal HD or the upcount signal UP depending on whether the current voltage data N is more than 10 mV different from the previous voltage data N-1. In a case where the comparator 130 compares upper 6 bits of the current voltage data N with upper 6 bits of the previous voltage data N-1, the comparator 130 generates the hold signal HD or the upcount signal UP depending on whether the current voltage data N is more than 20 mV (2.56V/128) different from the previous voltage data N-1.

The counter 140 upcounts by a predetermined value, for example, by 1, in response to the upcount signal UP output from the comparing unit 125, holds a current count value in response to the hold signal HD, and outputs the upcounted result as an amount of reflected light via an output port OUT.

Table 1 below shows values obtained when measuring the amount of reflected light using the reflected light amount measurer 115 shown in FIG. 9. If the ADC 100 outputs 8-bit digital data, the counter 140 upcounts by 1 in response to the upcount signal UP, the comparator 130 generates the upcount signal UP or the hold signal HD depending on whether upper 7 bits of the current voltage data N are equal to upper 7 bits of the previous voltage data N-1.

TABLE 1

| | When S-Curve varies in positive value | | | | | | | | When S-Curve varies in negative value | | | | | | | |
|---|---|---|---|---|---|---|---|---|---|---|---|---|---|---|---|---|
| FE(N) (Output of ADC) | 8'h02 | 8'h03 | 8'h04 | 8'h05 | 8'h06 | 8'h07 | 8'h08 | 8'hff | 8'hfd | 8'hfc | 8'hfb | 8'hfa | 8'hf9 | 8'hf8 | 8'hf7 |
| | 0000 0010 | 0000 0011 | 0000 0100 | 0000 0101 | 0000 0110 | 0000 0111 | 0000 1000 | 1111 1111 | 1111 1110 | 1111 1100 | 1111 1011 | 1111 1010 | 1111 1001 | 1111 1000 | 1111 0111 |
| FE(N-1) | 8'h01 | 8'h02 | 8'h03 | 8'h04 | 8'h05 | 8'h06 | 8'h07 | 8'hff | 8'hff | 8'hfd | 8'hfc | 8'hfb | 8'hfa | 8'hf9 | 8'hf8 |
| | 0000 0001 | 0000 0010 | 0000 0011 | 0000 0100 | 0000 0101 | 0000 0110 | 0000 0111 | 111111 11 | 1111 1111 | 1111 1110 | 1111 1100 | 1111 1011 | 1111 1010 | 1111 1001 | 1111 1000 |
| Output of comparator | UP | HD | UP | HD | UP | HD | UP | HD | HD | UP | UP | HD | UP | HD | UP |
| Operation of counter | 1 count | hold | 1 count | hold | 1 count | hold | 1 count | hold | hold | 1 count | 1 count | hold | 1 count | hold | 1 count |
| Output of counter | 1 | 1 | 2 | 2 | 3 | 3 | 4 | 4 | 4 | 5 | 6 | 6 | 7 | 7 | 8 |

As can be seen in Table 1, the comparator 130 compares the upper 7 bits of the current voltage data N with the upper 7 bits of the previous voltage data N-1, generates the upcount signal UP if the upper 7 bits of the current voltage data N are not equal to the 7 bits of the previous voltage data N-1, and generates the hold signal HD if the upper 7 bits of the current voltage data N are equal to the 7 bits of the previous voltage data N-1. The counter 140 upcounts by 1 in response to the upcount signal UP, holds the current count value in response to the hold signal HD, and outputs a final count value output from the counter 140 as a measured amount of reflected light via the output port OUT.

As described above, although S-Curves are offset or S-Curves have glitches due to noise components, an amount of reflected light does not greatly vary. Thus, a type of an inserted optical disc can be further accurately detected through the measurement of amounts of light reflected from S-Curves.

Figure 10:
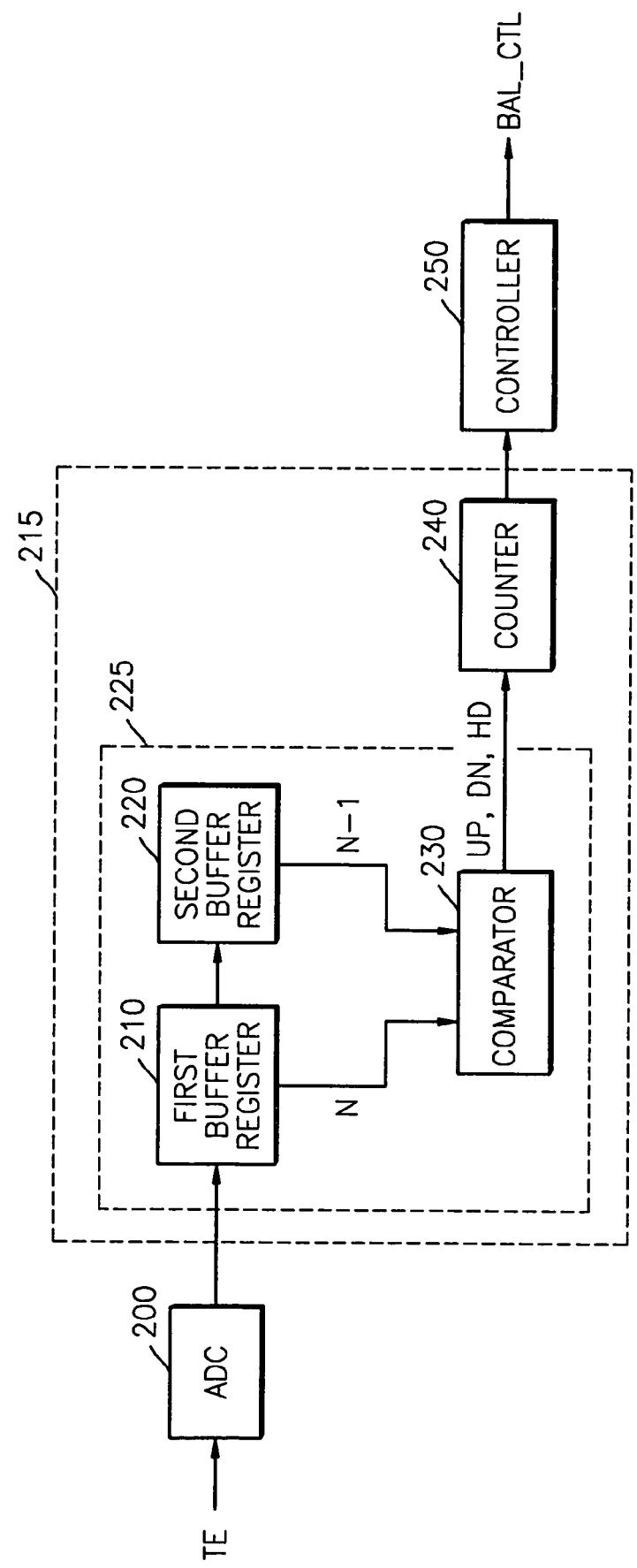
FIG. 10 is a block diagram of an apparatus for detecting a disc type according to still another embodiment of the present invention.

FIG. 10 is a block diagram of an apparatus for adjusting a track balance in an optical system by detecting a voltage of a tracking error signal, according to still another embodiment of the present invention. Referring to FIG. 10, the apparatus includes an ADC 200, a reflected light amount measurer 215, and a controller 250.

The ADC 200 converts a voltage level of an analog tracking error signal TE into an n-bit digital voltage data. The reflected light amount measurer 215 compares current voltage data N output from the ADC 210 with previous voltage current N-1 and then the current voltage data N and the previous voltage data N-1 with a reference voltage VREF. The reflected light amount measurer 215 performs an upcount or downcount operation for a predetermined balance adjustment time based on the comparison result and outputs the upcounted or downcounted result as an unbalance value. In more detail, if a predetermined voltage difference occurs between the current voltage data N and the previous voltage data N-1, the reflected light amount measurer 215 compares the current voltage data N and the previous voltage data N-1 with the reference voltage VREF. The reflected light amount measurer 215 performs the upcount operation if the current voltage data N and the previous voltage data N-1 are higher than the reference voltage VREF, and performs the downcount operation if the current voltage data N and the previous voltage data N-1 are lower than the reference voltage VREF. If one of the current voltage data N and the previous voltage data N-1 is higher than the reference voltage VREF and the other one of the current voltage data N and the previous voltage data N-1 is lower than the reference voltage VREF, the reflected light amount measurer 215 holds a current count value. Although the predetermined voltage difference occurs between the current voltage data N and the previous voltage data N-1, the reflected light amount measurer 215 holds the current count value in the low frequency domain such as section "H" of FIGS. 8A, 8B, and 8C.

The reflected light amount measurer 215 includes a comparing unit 225 and a counter 240. The comparing unit 225 compares the current voltage data N output from, the ADC 210 with the previous voltage data N-1 for a predetermined balance adjustment time. When the predetermined voltage difference occurs between the current voltage data N and the previous voltage data N-1, the comparing unit 225 compares the current voltage data N and the previous voltage data N-1 with the reference voltage VREF and outputs the upcount or downcount signal UP or DN or the hold signal HD based on the comparison result. The comparing unit 225 also outputs the hold signal HD in the low frequency domain such as section "H" of FIGS. 8A, 8B, and 8C. The comparing unit 225 includes first and second buffer registers 210 and 220 and a comparator 230.

The first buffer register 210 buffers n-bit voltage data output from the ADC 200 as the current voltage data N. The second buffer register 220 buffers the n-bit voltage data output from the first buffer register 210 as the previous voltage data N-1. The comparator 230 compares upper m (where m<n) bits of the n-bit voltage data buffered by the first buffer register 210 with m bits of the n-bit voltage data buffered by the second buffer register 220, generates the hold signal HD in the low frequency domain such as section "H" of FIGS. 8A, 8B, and 8C if the m bits of the n-bit voltage data are equal, and generates the upcount or down-count signal UP or DN if the m bits of the n-bit voltage data are different. For example, when the ADC 200 outputs 8 bits and a voltage of 3V is input to the ADC 200, the ADC 200 has a resolution of 12 mV (=3V/256). When the comparator 230 compares upper 7 bits of the current voltage data N with upper 7 bits of the previous voltage data N-1, the comparator 230 generates the hold signal HD or the upcount or down-count signal UP or DN depending on whether the current voltage data N is more than 12 mV different from the previous voltage data N-1. In the event that the comparator 230 compares upper 6 bits of the current voltage data N with upper 6 bits of the previous voltage data N-1, the comparator 230 generates the hold signal HD or the upcount or down-count signal UP or DN depending on whether the current voltage data N is more than 24 mV different from the previous voltage data N-1.

The counter 240 upcounts by a predetermined value, for example, by 1, in response to the upcount signal UP output from the comparing unit 225, downcounts by a predetermined value, for example, by 1, in response to the down-count signal DN, holds a current count value in response to the hold signal HD, and outputs a count value accumulated for the predetermined balance adjustment time as an unbalance value.

The controller 250 determines whether the unbalance value output from the reflected light amount measurer 215 exceeds an allowable error and outputs a balance control signal BAL_CTL to adjust a balance of the tracking error signal TE if the unbalance value exceeds the allowable error.

Table 2 below shows values obtained when generating unbalance values using the apparatus shown in FIG. 10. When the ADC 200 outputs 8-bit digital data, the counter 240 upcounts or downcounts by 1 in response to the upcount or downcount signal UP or DN, and the comparator 230 generates the upcount or downcount signal UP or DN or the hold signal HD depending on whether upper 7 bits of the current voltage data N are equal to upper 7 bits of the previous voltage data N-1.

the positive tracking error signal +TE and the negative tracking error signal -TE are asymmetrical with respect to the reference voltage VREF and thus an unbalance value is ±M (where M is a natural number) exceeding the allowable error, the controller 250 adjusts the balance of the tracking error signal TE so that the unbalance value does not exceed the allowable value.

In an apparatus and method for detecting a type of an optical disc and/or adjusting a track balance in an optical disc system by detecting voltages of a focus error signal and a tracking error signal according to the present invention, an unbalance of the tracking error signal can be adjusted by detecting the voltages of the focus error signal and the tracking error signal. Thus, the track balance can be further stably adjusted. In addition, the type of the disc can be further accurately detected without being affected by offset or noise components of the focus error signal.

These and other features and advantages of the present disclosure may be readily ascertained by one of ordinary skill in the pertinent art based on the teachings herein. It is to be understood that the teachings of the present disclosure may be implemented in various forms of hardware, software, or combinations thereof.

For example, the optical disc type detecting apparatus shown in FIG. 6 can be modified so as to be realized as an apparatus for adjusting a track balance by detecting a voltage of a tracking error signal. The optical disc type detecting apparatus shown in FIG. 9 can be modified to be realized as an apparatus for adjusting a track balance by detecting a voltage of a tracking error signal. Further, the process according to preferred embodiments of the present invention can be written as a computer-readable code to a computer-readable recording medium. The computer-readable recording media include all kinds of recording apparatuses on which computer-readable data is stored. Computer-readable recording media include ROMs, RAMs, CD-ROMs, magnetic tapes, floppy discs, optical data storing apparatuses, and carrier wave (e.g., the transmission over the Internet). The computer-readable recording media can store a computer-readable code on computer systems connected via a network in a scattering way and execute the computer-readable code.

TABLE 2

| | When tracking error signal varies in positive value | | | | | | | When tracking error signal varies in negative value | | | | | | |
|---|---|---|---|---|---|---|---|---|---|---|---|---|---|---|
| FE(N) (Output of ADC) | 8'h02 | 8'h03 | 8'h04 | 8'h05 | 8'h06 | 8'h07 | 8'h08 | 8'hff | 8'hfd | 8'hfc | 8'hfb | 8'hfa | 8'hf9 | 8'hf8 | 8'hf7 |
| | 0000 0010 | 0000 0011 | 0000 0100 | 0000 0101 | 0000 0110 | 0000 0111 | 0000 1000 | 1111 1111 | 1111 1110 | 1111 1100 | 1111 1011 | 1111 1010 | 1111 1001 | 1111 1000 | 1111 0111 |
| FE(N-1) | 8'h01 | 8'h02 | 8'h03 | 8'h04 | 8'h05 | 8'h06 | 8'h07 | 8'hff | 8'hff | 8'hfd | 8'hfc | 8'hfb | 8'hfa | 8'hf9 | 8'hf8 |
| | 0000 0001 | 0000 0010 | 0000 0011 | 0000 0100 | 0000 0101 | 0000 0110 | 0000 0111 | 111111 11 | 1111 1111 | 1111 1110 | 1111 1100 | 1111 1011 | 1111 1010 | 1111 1001 | 1111 1000 |
| Output of comparator | UP | HD | UP | HD | UP | HD | UP | HD | HD | DN | DN | HD | DN | | |
| Operation of counter | 1 up-count | hold | 1 down-count | hold | 1 up-count | hold | 1 up-count | hold | hold | 1 down-count | 1 down-count | hold | 1 down-count | 1 down-count | |
| Output of counter | 1 | 1 | 2 | 2 | 3 | 3 | 4 | 4 | 4 | 3 | 2 | 2 | 1 | 0 | |

As in Table 2, a final unbalance value output from the counter 240 is 0 indicating that a positive tracking error signal +TE and a negative tracking error signal -TE are symmetrical with respect to the reference voltage VREF. If Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. An apparatus for detecting a type of an optical disc inserted into an optical disc system, the apparatus comprising:
    an analog-to-digital converter that converts a focus error signal into an n-bit voltage data;
    a duty measurer that compares the n-bit voltage data with a positive noise voltage level and a negative noise voltage level, upcounts by a predetermined value if the n-bit voltage data is higher than the positive noise voltage level or lower than the negative voltage level, and outputs the upcounted result as a duty of the focus error signal, the duty measurer comprising:
    a comparing unit that generates an upcount signal if the n-bit voltage data is higher than the positive noise voltage level or lower than the negative voltage level and generates a hold signal if the n-bit voltage data is lower than the positive noise voltage level or higher than the negative voltage level,
    wherein the comparing unit comprises:
    a buffer register that buffers the n-bit voltage data;
    an absolute calculator that calculates an absolute value of the n-bit voltage data buffered by the buffer register; and
    a comparator that compares the absolute value output from the absolute value calculator with the positive noise level, generates the upcount signal if the absolute value is greater than the positive noise voltage level, and generates the hold signal if the absolute value is less than the positive noise voltage level.

2. The apparatus of claim 1, wherein the duty measurer further comprises:
    a counter that upcounts by a predetermined value in response to the upcount signal, holds a current count value in response to the hold signal, and outputs the upcounted result as the duty of the focus error signal.

3. An apparatus for detecting a type of an optical disc inserted into an optical disc system, the apparatus comprising:
    an analog-to-digital converter that converts a focus error signal into an n-bit voltage data; and
    a reflected light amount measurer that compares current voltage data of the n-bit voltage data with previous voltage data of the n-bit voltage data, upcounts by a predetermined value if the current voltage data is more than a predetermined value different from the previous voltage data, and outputs the upcounted result as an amount of reflected light,
    wherein the reflected light amount measurer comprises:
    a comparing unit that compares the current voltage data with the previous voltage data, generates an upcount signal if the current voltage data is more than the predetermined value different from the previous voltage data, and generates a hold signal if the current voltage data is not different from the previous voltage data; and
    a counter that upcounts by a predetermined value in response to the upcount signal output from, the comparing unit, holds a current count value in response to the hold signal, and outputs the upcounted result as the amount of reflected light.

4. The apparatus of claim 3, wherein the comparing unit comprises:
    a first buffer register that buffers the n-bit voltage data output from the analog-to-digital converter as the current voltage data;
    a second buffer register that buffers the n-bit voltage data output from the first buffer register as the previous voltage data; and
    a comparator that compares upper m bits of the n-bit voltage data buffered by the first buffer register with upper m bits of the n-bit voltage data buffered by the second buffer register, generates the hold signal if the upper m bits of the n-bit voltage data buffered by the first buffer register are equal to the upper m bits of the n-bit voltage data buffered by the second buffer register, and generates the upcount signal if the upper m bits of the n-bit voltage data buffered by the first buffer register are different from the upper m bits of the n-bit voltage data buffered by the second buffer register, wherein m is less than n.

5. A method of detecting a type of an optical disc inserted into an optical disc system, the method comprising:
    detecting a focus error signal from the optical disc; and
    measuring a duty of the focus error signal by detecting a voltage of the focus error signal and detecting the type of the optical disc depending on the measured duty,
    wherein the detection of the type of the optical disc comprises:
    converting the focus error signal into n-bit voltage data;
    buffering the n-bit voltage data;
    comparing the n-bit voltage data with a positive noise voltage level and a negative noise voltage level;
    upcounting by a predetermined value if the n-bit voltage data is higher than the positive noise voltage level or lower than the negative noise voltage level; and
    outputting the upcounted result as the duty of the focus error signal.

6. The method of claim 5, wherein the upcounting and outputting of the duty comprises:
    generating the upcount signal if the n-bit voltage data is higher than the positive noise voltage level or lower than the negative noise voltage level and generating the hold signal if the n-bit voltage data is lower than the positive noise voltage level or higher than the negative noise voltage level; and upcounting by the predetermined value in response to the upcount signal, holds a current count value in response to the hold signal, and outputs the upcounted result as the duty of the focus error signal.

7. The method of claim 6, wherein the generation of the upcount signal and the hold signal comprises:
    calculating an absolute value of the n-bit voltage data; and
    comparing the absolute value with the positive noise voltage level, generating the upcount signal if the absolute value is greater than the positive noise voltage level, and generating the hold signal if the absolute value is less than the positive noise voltage level.

8. A recording medium readable by machine, tangibly embodying a program of instructions executable by the machine to perform method steps for detecting a type of an optical disc inserted into an optical disc system, the method comprising:
    detecting a focus error signal from the optical disc; and
    measuring a duty of the focus error signal by detecting a voltage of the focus error signal and detecting the type of the optical disc depending on the measured duty, wherein the detecting of the type of the optical disc further comprises:
converting the focus error signal into n-bit voltage data;
buffering the n-bit voltage data;
comparing the n-bit voltage data with a positive noise voltage level and a negative noise voltage level;
upcounting by a predetermined value if the n-bit voltage data is higher than the positive noise voltage level or lower than the negative noise voltage level; and
outputting the upcounted result as the duty of the focus error signal.

9. A method of detecting a type of an optical disc inserted into an optical disc system, the method comprising:
detecting a focus error signal from the optical disc; and
measuring an amount of reflected light of the focus error signal by detecting a voltage of the focus error signal and detecting the type of the optical disc depending on the measured amount of reflected light,
wherein the detection of the type of the optical disc comprises:
converting the focus error signal n-bit voltage data; and
comparing current voltage data of the n-bit voltage data with previous voltage data of the n-bit voltage data, upcounting or downcounting by a predetermined value if the current voltage data is more than a predetermined value different from the previous voltage data, and outputting the upcounted or downcounted result as the amount of reflected light.

10. The method of claim 9, wherein the upcounting and outputting of the amount of reflected light comprises:
comparing the current voltage data N of the n-bit voltage data with the previous voltage data of the n-bit voltage data, generating an upcount or downcount signal if the current voltage data is more than the predetermined value different from the previous voltage data, and generating a hold signal if the current voltage data is not different from the previous voltage data; and
upcounting or downcounting by the predetermined value in response to the upcount or downcount signal, holding a current count value in response to the hold signal, and outputting the counted result as the amount of reflected light.

11. The method of claim 10, wherein in the generation of the upcount or down count signal and the hold signal, m bits of the current voltage data are compared with m bits of the previous voltage data, the hold signal is generated if the m bits of the current voltage data are equal to the m bits of the previous voltage data, and the upcount or downcount signal is generated if the m bits of the current voltage data are different from the m bits of the previous voltage data.

12. A recording medium readable by machine, tangibly embodying a program of instructions executable by machine to perform method steps for detecting a type of an optical disc inserted into an optical disc system, the method comprising:
detecting a focus error signal from the optical disc; and
measuring an amount of reflected light of the focus error signal by detecting a voltage of the focus error signal and detecting the type of the optical disc depending on the measured amount of reflected light,
wherein the detecting of the type of the optical disc further comprises:
converting the focus error signal n-bit voltage data; and
comparing current voltage data of the n-bit voltage data with previous voltage data of the n-bit voltage data, upcounting or downcounting by a predetermined value if the current voltage data is more than a predetermined value different from the previous voltage data, and outputting the upcounted or downcounted result as the amount of reflected light.

13. An apparatus for adjusting a track balance in an optical disc system, the apparatus comprising:
an analog-to-digital converter that converts a tracking error signal into n-bit voltage data;
a duty measurer that buffers the n-bit voltage data, compares the n-bit voltage data with a predetermined reference voltage, upcounts or downcounts by a predetermined value based on the comparison result, and outputs the counted result accumulated for a predetermined balance adjustment time as an unbalance value of the tracking error signal; and
a controller that compares the unbalance value with a predetermined allowable error and outputs a balance control signal to adjust a balance of the tracking error signal, if the unbalance value exceeds the predetermined allowable error.

14. The apparatus of claim 13, wherein the duty measurer comprises:
a buffer register that buffers the n-bit voltage data output from the analog-to digital converter;
a comparator that compares the n-bit voltage data buffered by the buffer register with the predetermined reference voltage and generates an upcount signal if the n-bit voltage data is greater than the predetermined reference voltage, and generates a downcount signal if the n-bit voltage data is less than the predetermined reference voltage; and
a counter that upcounts by a predetermined value in response to the upcount signal, downcounts by a predetermined value in response to the downcount signal, and outputs the counted result accumulated for the balance adjustment time as the unbalance value.

15. The apparatus of claim 14, wherein the comparator generates a hold signal if a frequency of the tracking error signal belongs to a predetermined low frequency domain, and the counter holds a current count value in response to the hold signal.

16. An apparatus for adjusting a track balance in an optical disc system by a detecting a voltage of a tracking error signal, the apparatus comprising:
an analog-to-digital converter that converts the tracking error signal into n-bit voltage data; and
a reflected light amount measurer that compares current voltage data of the n-bit voltage data and previous voltage data of the n-bit voltage data with a reference voltage, upcounts or downcounts by a predetermined value based on the comparison result, and outputs the counted result accumulated for a predetermined balance adjustment time as an unbalance value of the tracking error signal; and a controller that compares the unbalance value with a predetermined allowable error and outputs a balance control signal to adjust a balance of the tracking error signal if the unbalance value exceeds the predetermined allowable error,
wherein the reflected light amount measurer comprises:
a comparing unit that compares the current voltage data with the previous voltage data, compares the current voltage data and the previous voltage data with a reference voltage if a predetermined voltage difference occurs between the current voltage data and the previous voltage data, and generates an upcount signal, a downcount signal, or a hold signal based on the comparison result; and a counter that upcounts by a predetermined value in response to the upcount signal, downcounts by a predetermined value in response to the downcount signal, or holds a current count value in response to the hold signal, and outputs the counted value accumulated for the predetermined balance adjustment time as the unbalance value.

17. The apparatus of claim 16, wherein the comparing unit generates the hold signal if the tracking error signal belongs to a predetermined low frequency domain.

18. The apparatus of claim 16, wherein the comparing unit comprises:
a first buffer register that buffers the n-bit voltage data output from the analog-to-digital converter as the current voltage data;
a second buffer register that buffers the n-bit voltage data output from the first buffer register as the previous voltage data; and
a comparator that compares the current voltage data with the previous voltage data, compares the current voltage data and the previous voltage data with the reference voltage if the predetermined voltage difference occurs between the current voltage data and the previous voltage data, generates the upcount signal if the current voltage data and the previous voltage data are higher than the reference voltage, generates the downcount signal if the current voltage data and the previous voltage data are lower than the reference voltage, and generates the hold signal if only one of the current voltage data and the previous voltage data is higher or lower than the reference voltage.

19. The apparatus of claim 18, wherein the comparator generates the hold signal if the tracking error signal belongs to the predetermined low frequency domain.

20. A method of adjusting a track balance in an optical disc system, the method comprising:
detecting a tracking error signal from an optical disc inserted into the optical disc system; detecting a voltage of the tracking error signal and measuring a duty of the tracking error signal with respect to a predetermined reference voltage as an unbalance value for a predetermined balance adjustment time; and
comparing the unbalance value with a predetermined allowable error and generating a balance control signal to adjust a balance of the tracking error signal if the unbalance value exceeds the predetermined allowable error,
wherein the measuring of the unbalance value comprises:
converting the tracking error signal into n-bit voltage data;
buffering the n-bit voltage data; and
comparing the n-bit voltage data with the reference voltage, upcounts or downcounts by a predetermined value for the predetermined balance adjustment time based on the comparison result and outputting the counted result accumulated for the predetermined balance adjustment time as the unbalance value.

21. The method of claim 20, wherein the outputting of the unbalance value comprises:
comparing the n-bit voltage data with the reference voltage, generating an upcount signal if the n-bit voltage data is greater than the reference voltage, and generating a downcount signal if the n-bit voltage data is less than the reference voltage; and upcounting by a predetermined value for the balance adjustment time in response to the upcount signal, downcounting by a predetermined value in response to the downcount signal, and outputting the counted result accumulated for the balance adjustment time as the unbalance value.

22. The method of claim 21, further comprising:
generating a hold signal if a frequency of the tracking error signal belongs to a predetermined low frequency domain; and
holding a current count value in response to the hold signal.

23. A recording medium readable by machine, tangibly embodying a program of instructions executable by the machine to perform method steps for adjusting a track balance in an optical disc system, the method comprising:
detecting a tracking error signal from an optical disc inserted into the optical disc system;
detecting a voltage of the tracking error signal and measuring a duty of the tracking error signal with respect to a predetermined reference voltage as an unbalance value for a predetermined balance adjustment time; and
comparing the unbalance value with a predetermined allowable error and generating a balance control signal to adjust a balance of the tracking error signal if the unbalance value exceeds the predetermined allowable error,
wherein the measuring of the unbalance value comprises:
converting the tracking error signal into n-bit voltage data;
buffering the n-bit voltage data; and
comparing the n-bit voltage data with the reference voltage, upcounts or downcounts by a predetermined value for the predetermined balance adjustment time based on the comparison result and outputting the counted result accumulated for the predetermined balance adjustment time as the unbalance value.

24. A method of adjusting a track balance in an optical disc system, the method comprising:
detecting a tracking error signal from an optical disc inserted into the optical disc system;
detecting a voltage of the tracking error signal and measuring an amount of reflected light of the tracking error signal with respect to a predetermined reference voltage as an unbalance value of the tracking error signal for a predetermined balance adjustment time; and
comparing the unbalance value with a predetermined allowable error and generating a balance control signal to adjust a balance of the tracking error signal if the unbalance value exceeds the predetermined allowable error,
wherein the outputting of the unbalance value comprises:
converting the tracking error signal into n-bit voltage data; and
comparing current voltage data of the n-bit voltage data and previous voltage data of the n-bit voltage data with a reference voltage, upcounting or downcounting by a predetermined value for the balance adjustment time, and outputting the counted result accumulated for the balance adjustment time as the unbalance value.

25. The method of claim 24, wherein the outputting of the unbalance value comprises:
comparing the current voltage data and the previous voltage data with the reference voltage if a predetermined voltage difference occurs between the current voltage data and the previous voltage data;
generating an upcount signal if the current voltage data and the previous voltage data are higher than the reference voltage;
generating a downcount signal if the current voltage data and the previous voltage data are lower than the reference voltage;

generating the hold signal if only one of the current voltage data and the previous voltage data is higher or lower than the reference voltage;

upcounting by a predetermined value for the balance adjustment time in response to the upcount signal, downcounts by a predetermined value in response to the downcount signal, and holding a current count value in response to the hold signal; and outputting the counted result accumulated for the balance adjustment time as the unbalance value.

26. The method of claim 25, further comprising: generating the hold signal if a frequency of the tracking error signal belongs to a predetermined low frequency domain.

27. A recording medium readable by machine, tangibly embodying a program of instructions executable by the machine to perform method steps for adjusting a track balance in an optical disc system, comprising:

detecting a tracking error signal from an optical disc inserted into the optical disc system;

detecting a voltage of the tracking error signal and measuring an amount of reflected light of the tracking error signal with respect to a predetermined reference voltage as an unbalance value of the tracking error signal for a predetermined balance adjustment time; and comparing the unbalance value with a predetermined allowable error and generating a balance control signal to adjust a balance of the tracking error signal if the unbalance value exceeds the predetermined allowable error, wherein obtaining the unbalance value comprises:

converting the tracking error signal into n-bit voltage data; and comparing current voltage data of the n-bit voltage data and previous voltage data of the n-bit voltage data with a reference voltage, upcounting or downcounting by a predetermined value for the balance adjustment time, and outputting the counted result accumulated for the balance adjustment time as the unbalance value.

* * * * *